(12) United States Patent
Liu (10) Patent No.: US 12,330,062 B2
(45) Date of Patent: Jun. 17, 2025

(54) VIRTUAL OBJECT CONTROL METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventor: Zhihong Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 248 days.

(21) Appl. No.: 17/963,141

(22) Filed: Oct. 10, 2022

(65) Prior Publication Data

US 2023/0033902 A1 Feb. 2, 2023

Related U.S. Application Data

(63) Continuation of application No. PCT/CN2022/070089, filed on Jan. 4, 2022.

(30) Foreign Application Priority Data

Feb. 9, 2021 (CN) .......................... 202110178458.6

(51) Int. Cl.
*A63F 13/56* (2014.01)
*A63F 13/822* (2014.01)

(52) U.S. Cl.
CPC ............ *A63F 13/56* (2014.09); *A63F 13/822* (2014.09); *A63F 2300/6607* (2013.01)

(58) Field of Classification Search
CPC ................ A63F 13/537; A63F 13/5372; A63F 13/5375; A63F 13/5378; A63F 13/55;

(Continued)

(56) References Cited

U.S. PATENT DOCUMENTS 6,166,718 A * 12/2000 Takeda .................... A63F 13/52
345/419
6,267,674 B1 * 7/2001 Kondo .................... A63F 13/10
463/32

(Continued)

FOREIGN PATENT DOCUMENTS

CN 109701274 A 5/2019
CN 110507993 A 11/2019

(Continued)

OTHER PUBLICATIONS

CN 110755841 A, machine translation, copyright 2024 Clarivate Analytics, downloaded Sep. 20, 2024 from PE2E Search.*

(Continued)

*Primary Examiner* — David L Lewis
*Assistant Examiner* — Matthew D Hoel
(74) *Attorney, Agent, or Firm* — Morgan, Lewis & Bockius LLP (57) ABSTRACT

A method of controlling a virtual object in a virtual scene is performed by a computer device. The method includes: displaying a virtual scene picture including a first virtual object, the first virtual object including a first body part equipped with a first virtual prop and a second body part equipped with a second virtual prop; in response to receiving a first trigger operation on the first virtual object, controlling the first virtual object to perform a target action based on the first virtual prop equipped at the first body part of the first virtual object; and in response to receiving a second trigger operation within a specified duration after the first trigger operation is received, controlling the first virtual object to perform the target action based on the second virtual prop equipped at the second body part of the first virtual object.

20 Claims, 7 Drawing Sheets

(58) Field of Classification Search
CPC .......... A63F 13/56; A63F 13/57; A63F 13/63;
A63F 13/35; A63F 13/52; A63F 13/573;
A63F 13/42; A63F 13/833; A63F 13/577;
A63F 13/837; A63F 2300/6607; A63F
2300/8029; A63F 2300/8076
See application file for complete search history.

(56) References Cited

U.S. PATENT DOCUMENTS

| | | | |
|---|---|---|---|
| 6,354,942 B1* | 3/2002 | Kaku | A63F 13/426 463/31 |
| 6,525,736 B1* | 2/2003 | Erikawa | A63F 13/426 345/473 |
| 7,136,080 B1* | 11/2006 | Kaminagayoshi | A63F 13/822 463/31 |
| 10,183,222 B2 | 1/2019 | Tsui et al. | |
| 2002/0045470 A1* | 4/2002 | Atsumi | A63F 13/10 463/9 |
| 2002/0142837 A1* | 10/2002 | Nakazato | A63F 13/5252 463/33 |
| 2002/0187837 A1* | 12/2002 | Hasebe | A63F 13/52 463/43 |
| 2003/0003999 A1* | 1/2003 | Kobayashi | A63F 13/822 463/43 |
| 2003/0083117 A1* | 5/2003 | Rupert | A63F 13/812 463/4 |
| 2007/0105626 A1* | 5/2007 | Cho | A63F 13/56 463/37 |
| 2007/0155508 A1 | 7/2007 | Sun et al. | |
| 2007/0206003 A1* | 9/2007 | Yoshida | A63F 13/5378 345/419 |
| 2007/0213107 A1* | 9/2007 | Itou | A63F 13/56 463/1 |
| 2008/0102950 A1* | 5/2008 | Ishii | A63F 13/58 463/31 |
| 2008/0207323 A1* | 8/2008 | Hiroshige | A63F 13/525 463/32 |
| 2009/0069086 A1* | 3/2009 | Shioda | A63F 13/56 463/36 |
| 2009/0098919 A1* | 4/2009 | Yuji | A63F 13/47 463/9 |
| 2013/0102387 A1* | 4/2013 | Barsoum | G06V 20/653 463/36 |
| 2020/0061473 A1 | 2/2020 | Shuster | |
| 2021/0287415 A1* | 9/2021 | Ding | G06T 11/60 |
| 2021/0322885 A1* | 10/2021 | Matsunaga | A63F 13/56 |
| 2022/0040580 A1* | 2/2022 | Wan | A63F 13/426 |
| 2023/0033902 A1* | 2/2023 | Liu | A63F 13/56 |
| 2023/0093624 A1* | 3/2023 | Zhang | A63F 13/58 463/31 |
| 2023/0149814 A1* | 5/2023 | Hirata | A63F 13/56 463/31 |
| 2023/0356094 A1* | 11/2023 | Hall | A63F 13/44 |
| 2023/0390640 A1* | 12/2023 | Seo | A63F 13/56 |
| 2024/0139628 A1* | 5/2024 | Okuda | A63F 13/57 |
| 2024/0367048 A1* | 11/2024 | Endo | A63F 13/52 |

FOREIGN PATENT DOCUMENTS

| | | |
|---|---|---|
| CN | 110755841 A | 2/2020 |
| CN | 111054065 A | 4/2020 |
| CN | 111359206 A | 7/2020 |
| CN | 111589125 A | 8/2020 |
| CN | 111589130 A | 8/2020 |
| CN | 111672116 A | 9/2020 |
| CN | 112044072 A | 12/2020 |
| CN | 112044084 A | 12/2020 |
| CN | 112807680 A | 5/2021 |
| JP | H 084859 A | 1/1996 |
| JP | 2005006912 A | 1/2005 |
| JP | 3747050 B1 | 2/2006 |
| JP | 2013058136 A | 3/2013 |
| TW | 201408353 A | 3/2014 |
| WO | WO 2016079828 A1 | 5/2016 |

OTHER PUBLICATIONS

Tencent Technology, ISR, PCT/CN2022/070089, Apr. 2, 2022, 3 pgs.

IQIYI video, "How Does Ake in the Glory of the King Achieve 456 Knives in One Second, Crit with Knives", Jul. 2, 2017, 2 pgs., Retrieved from the Internet: http://www.igivi.com/w_19rtv3vlw5.html.

Forum.Gamer.com, "[Discussion]Knowledge Sharing String", May 14, 2020, 12 pgs., Retrieved from the Internet: https://forum.gamer.com.tw/C.php?bsn=30518&snA=41523.

Tencent Technology, Japanese Office Action, JP Patent Application No. 2023-547759, Jul. 19, 2024, 15 pgs.

Enterbrain Co., Ltd., "Metal Gear Solid HD Edition—Official Operation Guide", "First-Person Viewpoint/Viewpoint Movement" (col. on p. 41), "Punch/Kick" (col. on p. 42), Jan. 2012, pp. 37, 41-42, Retrieved from the Internet: https://metalgear.fandom.com/wiki/Metal_Gear_Solid:_HD_Collection.

Famitsu App, "A Full-Fledged Action that Allows You to Control Monsters! Get Drunk with the Flashy Production of Nexon's New Dark Avenger Cross" Dec. 2016, Retrieved from the Internet: https://www.famitsu.com/.

FromSoftware.jp, "Thousand Land", Battle Simulator Where the Players Create a Sandbox Land with Various Environmental Pieces to Choose From and Protect the Land From the Opponents, Field Ikusei Strategy (Real-time Strategy), Mar. 2003, Retrieved from the Internet: https://www.fromsoftware.jp/ww/detail.html?csm=025.

Hatena Blog, "Apex Legends—New Event "Chaos Theory" Patch Notes Summary", Mar. 2021, Retrieved from the Internet: https://byakkaryouran.hatenadiary.com/.

Note.com, "Apex Legends: How to Earn Kill Points in Ranked Matches", Touya, Sep. 2020, Retrieved from the Internet: https://note.com/touya0117/n/n45a311160241.

Youtube.com, "Stylish Apex: Of Course We'll Resist, Right? With Our Fists (Glove)", Apex Legends, Jan. 2021, Retrieved from the Internet: https://www.youtube.com/watch?v=C-rzgzPh-FU.

Yoyaku-top10.jp Blog, "HIT [Strategy]: From the Basics of the Action You Should Remember at the Beginning the Difficult Part of the Early Game, "Warrior Captain Imanol", a Thorough Strategy!", Dec. 2016, Retrieved from the Internet: https://yoyaku-top10.jp/pc/blogs/MjY.

Tencent Technology, WO, PCT/CN2022/070089, Apr. 2, 2022, 4 pgs.

Tencent Technology, IPRP, PCT/CN2022/070089, Aug. 15, 2023, 5 pgs.

Tencent Technology, Japanese Office Action, JP Patent Application No. 2023-547759, Dec. 13, 2024, 15 pgs.

BoomAppGames.com, "Real Boxing2 Creed"—The Official Smartphone Game of the Movie "Creed: The Man Who Succeeds the Champ! Practice and Fight to Reach the Top of Boxing"! Dec. 2015, Retrieved from the Internet: https://game.boom-app.com/entry/realboxing2creed-review.

* cited by examiner

VIRTUAL OBJECT CONTROL METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/070089, entitled "CONTROL METHODS, DEVICES, DEVICES, STORAGE MEDIA, AND PROGRAM PRODUCTS FOR VIRTUAL OBJECTS" filed on Jan. 4, 2022, which claims priority to Chinese Patent Application No. 202110178458.6, filed with the State Intellectual Property Office of the People's Republic of China on Feb. 9, 2021, and entitled "VIRTUAL OBJECT CONTROL METHOD AND APPARATUS IN VIRTUAL SCENE, DEVICE, STORAGE MEDIUM, AND PROGRAM PRODUCT", all of which are incorporated herein by reference in their entirety.

FIELD OF THE TECHNOLOGY

This application relates to the field of virtual scene technologies, and in particular, to a virtual object control method and apparatus, a device, a storage medium, and a program product.

BACKGROUND OF THE DISCLOSURE

Currently, in a game application with virtual props, such as a first person shooting game, a melee virtual weapon used for melee may be included.

In the related art, the melee virtual weapon is a single-handed melee virtual weapon. When a target object is attacked through the single-handed melee virtual weapon, it is necessary to wait for the melee virtual weapon to be folded before a next attack is performed.

However, the solution of attacking through the single-handed melee virtual weapon makes interaction efficiency lower when a user controls a virtual object to attack.

SUMMARY

Embodiments of this application provide a virtual object control method and apparatus, a device, a storage medium, and a program product, which can improve interaction efficiency when a virtual object is controlled to perform interaction. The technical solutions are as follows.

According to an aspect, the embodiments of this application provide a method of controlling a virtual object in a virtual scene performed by a computer device, the method comprising:
  displaying a virtual scene picture including a first virtual object, the first virtual object including a first body part equipped with a first virtual prop and a second body part equipped with a second virtual prop;
  in response to receiving a first trigger operation on the first virtual object, controlling the first virtual object to perform a target action based on the first virtual prop equipped at the first body part of the first virtual object; and
  in response to receiving a second trigger operation within a specified duration after the first trigger operation is received, controlling the first virtual object to perform the target action based on the second virtual prop equipped at the second body part of the first virtual object.

According to another aspect, the embodiments of this application provide a virtual object control apparatus, applied to a computer device, the apparatus including:
  a picture display module, configured to display a virtual scene picture including a first virtual object, the first virtual object including a first body part equipped with a first virtual prop and a second body part equipped with a second virtual prop;
  a first execution module, configured to control, in response to receiving a first trigger operation on the first virtual object, the first virtual object to perform a target action based on the first virtual prop equipped at the first body part of the first virtual object; and
  a second execution module, configured to control, in response to receiving a second trigger operation within a specified duration after the first trigger operation is received, the first virtual object to perform the target action based on the second virtual prop equipped at the second body part of the first virtual object.

In one implementation, the target action includes a body part unfolding action and a body part folding action that are performed sequentially; and
  the specified duration is no longer than a duration for which the body part unfolding action is fully performed.

In one implementation, the second execution module includes:
  an execution submodule, configured to terminate, in response to receiving the second trigger operation within the specified duration after the first trigger operation is received, the body part unfolding action performed based on the first virtual prop equipped at the first body part, and immediately control the first virtual object to perform the target action based on the second virtual prop equipped at the second body part.

In one implementation, the first trigger operation includes a click operation performed on a target control superimposed on an upper layer of the virtual scene picture.

In one implementation, the apparatus further includes:
  a third execution module, configured to control, in response to receiving a third trigger operation, the first virtual object to perform the target action in turn based on the first and second virtual props respectively equipped at the first and second body parts.

In one implementation, the second trigger operation includes a long press operation performed on a target control superimposed on an upper layer of the virtual scene picture.

In one implementation, the apparatus further includes:
  a fourth execution module, configured to, when the long press operation ends, control the first virtual object to stop performing the target action in turn based on the first and second virtual props respectively equipped at the first and second body parts.

In one implementation, the apparatus further includes:
  an attribute value modification module, configured to modify a target attribute value of a second virtual object based on the target action, the second virtual object being a virtual object located within an action range of the target action.

In one implementation, the attribute value modification module includes:
  an object determining submodule, configured to determine the second virtual object located within the action range of the target action; and
  an object elimination submodule, configured to modify the target attribute value of the second virtual object to zero to eliminate the second virtual object.

In one implementation, the apparatus further includes:
a point increasing submodule, configured to increase, in response to eliminating the second virtual object through the target action, a virtual point of the first virtual object by a first score.

In one implementation, the apparatus further includes:
a number obtaining submodule, configured to obtain a number of the second virtual objects in virtual objects that are continuously eliminated by the first virtual object through the target action before in response to eliminating the second virtual object through the target action, a virtual point of the first virtual object is increased by a first score; and a score determining submodule, configured to determine the first score based on the number of the second virtual objects in the virtual objects that are continuously eliminated by the first virtual object through the target action.

In one implementation, the first and second body parts include two hand parts, and the first and second virtual props are two glove virtual props.

According to another aspect, the embodiments of this application provide a computer device including a processor and a memory, the memory storing at least one instruction, the at least one instruction being loaded and executed by the processor and causing the computer device to implement the virtual object control method described in the foregoing aspects.

According to another aspect, the embodiments of this application provide a non-transitory computer-readable storage medium, storing at least one instruction, the at least one instruction being loaded and executed by a processor of a computer device and causing the computer device to implement the virtual object control method described in the foregoing aspects.

According to an aspect of this application, a computer program product or a computer program is provided, including computer instructions, the computer instructions being stored in a non-transitory computer-readable storage medium. A processor of a computer device reads the computer instructions from the computer-readable storage medium, and executes the computer instructions, to cause the computer device to perform the virtual object control method provided in the implementations of the foregoing aspects.

The technical solutions provided in the embodiments of this application have at least the following beneficial effects:

In the embodiments of this application, when the terminal receives the first trigger operation, the computer device controls the first virtual prop equipped at the first body part of the first virtual object to perform the target action. When the terminal receives the first trigger operation again within the specified duration of the received first trigger operation, the computer device controls the first virtual prop equipped at the second body part of the first virtual object to perform the target action. According to the foregoing method, when same virtual props are equipped at a plurality of body parts, and two trigger operations are received within a short time, the computer device can control the virtual props equipped at different body parts to perform the target action twice within a short time in the virtual scene, which can shorten a time interval between two successive target actions, thereby improving efficiency of controlling the virtual object to use the virtual prop to perform the target action.

BRIEF DESCRIPTION OF THE DRAWINGS

Accompanying drawings herein are incorporated into a specification and constitute a part of this specification, show embodiments that conform to this application, and are used for describing a principle of this application together with this specification.

DESCRIPTION OF EMBODIMENTS

Exemplary embodiments are described in detail herein, and examples of the exemplary embodiments are shown in the accompanying drawings. Unless otherwise specified, the same reference numerals in different drawings represent the same or similar elements when a drawing is mentioned in the following description. The implementations described in the exemplary embodiments below are not intended to represent all implementations according to this application. Instead, they are merely examples of the apparatus and method according to some aspects of this application as recited in the appended claims.

Virtual Scene: It is a virtual scene displayed (or provided) when an application program is run on a terminal. The virtual scene may be a simulated environment scene of a real world, or may be a semi-simulated semi-fictional three-dimensional environment scene, or may be an entirely fictional three-dimensional environment scene. The virtual scene may be any one of a two-dimensional virtual scene, a 2.5-dimensional virtual scene, and a three-dimensional virtual scene, and description is made by using an example in which the virtual scene is a three-dimensional virtual scene in the following embodiments, but this is not limited. In some embodiments, the virtual scene may be further used for a virtual scene battle between at least two virtual roles. In some embodiments, the virtual scene may be further used for a battle performed between at least two virtual roles by using virtual guns. In some embodiments, the virtual scene may be further used for a battle performed between at least two virtual roles by using virtual guns in a range of a target region, and the range of the target region may be continuously decreased as time goes by in the virtual scene.

Virtual object: It refers to a movable object in a virtual scene. The movable object may be at least one of a virtual character, a virtual animal, and a virtual vehicle. In some embodiments, when the virtual scene is a three-dimensional virtual scene, the virtual object is a three-dimensional model created based on a skeletal animation technology. Each virtual object has a shape, a volume and an orientation in the three-dimensional virtual scene, and occupies some space in the three-dimensional virtual scene.

The virtual scene is generally generated by an application program in a terminal such as a computer device and presented based on hardware (for example, a screen) in the terminal. The terminal may be a mobile terminal such as a smartphone, a tablet computer, or an e-book reader. Alternatively, the terminal may be a personal computer device such as a notebook computer or a fixed computer.

Virtual prop: It refers to a prop that can be used by a virtual object in a virtual environment, including an offensive prop that can cause damage to another virtual object, a supply prop that can provide supply for the offensive prop, a virtual pendant that can be mounted on a specified offensive prop to provide the offensive prop with part of attribute bonus, and a defensive prop that resists or buffers a damage effect of a virtual weapon.

First person shooting game: It refers to a shooting game in which a user can play from a first-person perspective. A virtual environment picture in the game is a picture of observing a virtual environment from the perspective of a first virtual object. In the game, at least two virtual objects play in a single-round battle mode in the virtual environment. The virtual object eludes damage from other virtual objects and dangers (for example, a poison gas area and a swamp) in the virtual environment to survive in the virtual environment. When a health point of a virtual object in the virtual environment is zero, the virtual object is eliminated in the virtual environment, and a final virtual object surviving in the virtual environment wins. In some embodiments, a battle starts with a moment when a first client joins the battle, and ends with a moment when the last client exits the battle. Each client may control one or more virtual objects in the virtual environment. In some embodiments, arena modes of the battle may include a single-player battle mode, a two-player team battle mode, or a multi-player team battle mode. The battle mode is not limited in the embodiments of this application.

Figure 1:
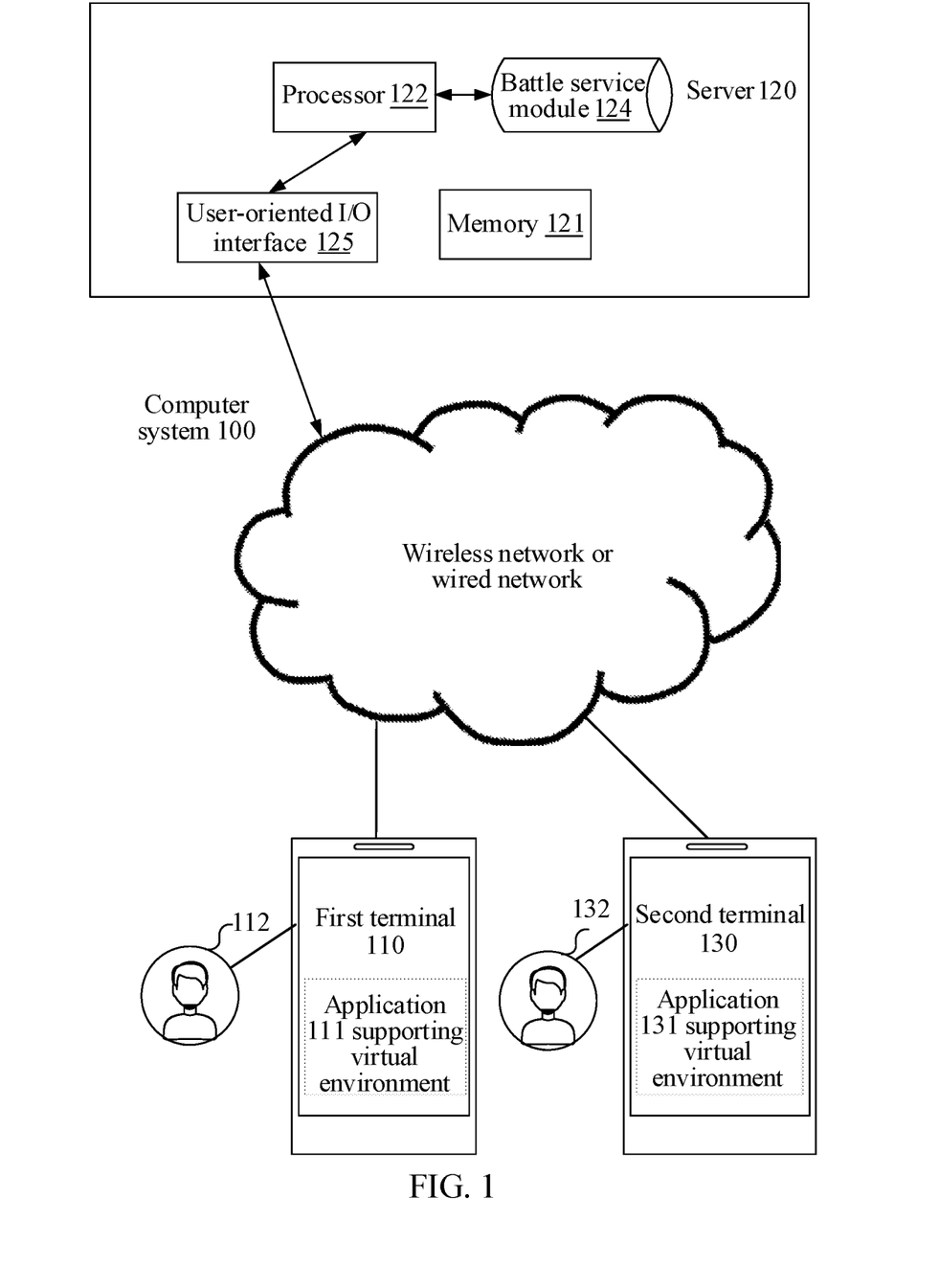
FIG. 1 is a schematic diagram of a virtual object control system according to an exemplary embodiment of this application.

FIG. 1 is a schematic diagram of a virtual object control system according to an embodiment of this application. The system may include: a first terminal 110, a server 120, and a second terminal 130.

An application 111 supporting a virtual environment is installed and run on the first terminal 110, and the application 111 may be a multiplayer online battle program. When the first terminal runs the application 111, a UI of the application 111 is displayed on a screen of the first terminal 110. The application 111 may be any one of a multiplayer online battle arena (MOBA) game, an escape shooting game, and a simulation game (SLG). In this embodiment, an example in which the application 111 is a first person shooting game (FPS) is used for description. The first terminal 110 is a terminal used by a first user 112. The first user 112 uses the first terminal 110 to control a first virtual object located in the virtual environment to perform activities, and the first virtual object may be referred to as a master virtual object of the first user 112. Activities of the first virtual object include, but are not limited to: at least one of adjusting body postures, crawling, walking, running, riding, flying, jumping, driving, picking, shooting, attacking, throwing, and skill releasing. Exemplarily, the first virtual object is a first virtual character such as a simulated character or an animation character.

An application 131 supporting a virtual environment is installed and run on the second terminal 130, and the application 131 may be a multiplayer online battle program. When the second terminal 130 runs the application 131, a UI of the application 131 is displayed on a screen of the second terminal 130. The client may be any one of a MOBA game, an escape shooting game, and an SLG game. In this embodiment, an example in which the application 131 is an FPS game is used for description. The second terminal 130 is a terminal used by a second user 132. The second user 132 uses the second terminal 130 to control a second virtual object located in the virtual environment to perform activities, and the second virtual object may be referred to as a master virtual role of the second user 132. Exemplarily, the second virtual object is a second virtual character, such as a simulated character or an animation character.

In some embodiments, the first virtual object and the second virtual object are located in the same virtual world. In some embodiments, the first virtual object and the second virtual object may belong to the same camp, the same team, or the same organization, have a friend relationship with each other, or have a temporary communication permission. In some embodiments, the first virtual object and the second virtual object may belong to different camps, different teams, or different organizations, or have a hostile relationship with each other.

In some embodiments, the application installed on the first terminal 110 is same as the application installed on the second terminal 130, or the applications installed on the two terminals are applications of a same type on different operating system platforms (such as Android or IOS). The first terminal 110 may generally refer to one of a plurality of terminals, and the second terminal 130 may generally refer to another one of a plurality of terminals. In this embodiment, only the first terminal 110 and the second terminal 130 are used as an example for description. The device types of the first terminal 110 and the second terminal 130 are the same or different. The device types include: at least one of a smartphone, a tablet computer, an e-book reader, a Moving Picture Experts Group Audio Layer III (MP3) player, a Moving Picture Experts Group Audio Layer IV (MP4) player, a laptop portable computer, and a desktop computer.

FIG. 1 shows only two terminals. However, a plurality of other terminals may access the server 120 in different embodiments. In some embodiments, one or more terminals are terminals corresponding to a developer. A developing and editing platform for the application supporting a virtual environment is installed on the terminal. The developer may edit and update the application on the terminal and transmit an updated application installation package to the server 120 by using a wired or wireless network. The first terminal 110 and the second terminal 130 may download the application installation package from the server 120 to update the application.

The first terminal 110, the second terminal 130, and the other terminals are connected to the server 120 through a wireless or wired network.

The server 120 includes at least one of one server, a server cluster including a plurality of servers, a cloud computing platform, and a virtualization center. The server 120 is configured to provide a backend service for an application program supporting a three-dimensional virtual environment. In some embodiments, the server 120 is in charge of primary computing, and the terminals are in charge of secondary computing. Alternatively, the server 120 is in charge of the secondary computing, and the terminals are in charge of the primary computing. Alternatively, the server 120 and the terminal perform collaborative computing based on a distributed computing architecture.

In an exemplary example, the server 120 includes a memory 121, a processor 122, a battle service module 124, and a user-oriented input/output (I/O) interface 125. The processor 122 is configured to load instructions stored in the server 120, and process data in the battle service module 124. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange.

Figure 2:
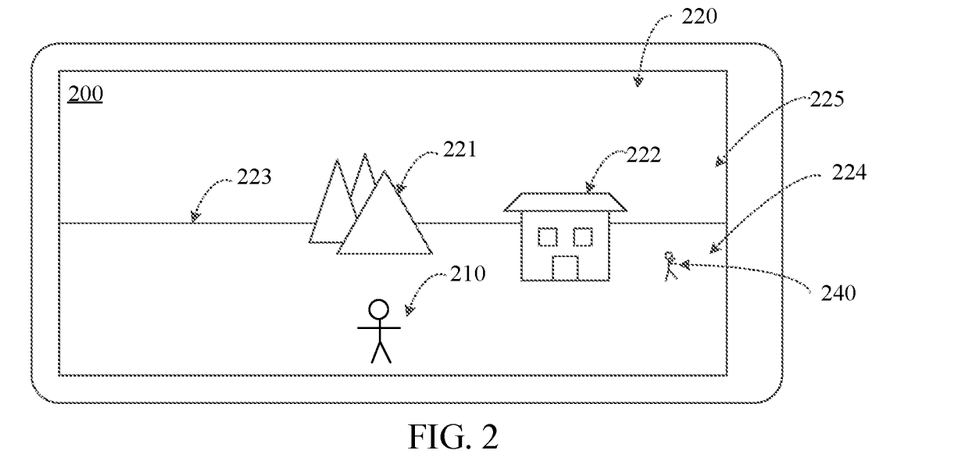
FIG. 2 is a schematic diagram of a display interface of a virtual scene according to an exemplary embodiment of this application.

The virtual scene may be a three-dimensional virtual scene, or the virtual scene may be a two-dimensional virtual scene. Using an example in which the virtual scene is a three-dimensional virtual scene, FIG. 2 shows a schematic diagram of a display interface of a virtual scene according to an exemplary embodiment of this application. As shown in FIG. 2, the display interface of the virtual scene includes a scene picture 200, and the scene picture 200 includes a currently-controlled virtual object 210, an environment picture 220 of the three-dimensional virtual scene, and a virtual object 240. The virtual object 240 may be a virtual object controlled by a user corresponding to another terminal or a virtual object controlled by an application.

In FIG. 2, the currently-controlled virtual object 210 and the virtual object 240 are three-dimensional models in the three-dimensional virtual scene, and the environment picture of the three-dimensional virtual scene displayed in the scene picture 200 includes objects observed from a viewing angle of the currently-controlled virtual object 210. Exemplarily, as shown in FIG. 2, under the observation from the viewing angle of the currently-controlled virtual object 210, the displayed environment picture 220 of the three-dimensional virtual scene includes the earth 224, the sky 225, the horizon 223, a hill 221, and a factory 222.

The currently-controlled virtual object 210 may release skill, use or move a virtual prop, and perform a specified action under control of a user. Under the control of the user, a virtual object in a virtual scene may display different three-dimensional models. For example, a screen of a terminal supports a touch operation, and the scene picture 200 of the virtual scene includes a virtual control. When the user touches the virtual control, the currently-controlled virtual object 210 may perform the specified action in the virtual scene and display a currently corresponding three-dimensional model.

Figure 3:
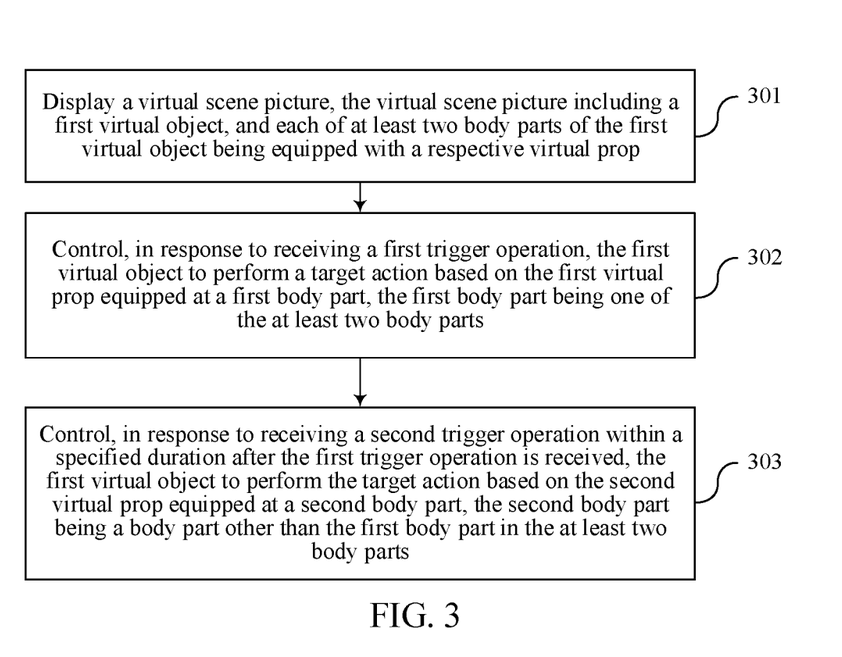
FIG. 3 is a flowchart of a virtual object control method according to an exemplary embodiment of this application.

By using the virtual object control method, the terminal may perform a target action through a first body part by receiving a first trigger operation in the virtual scene, then receive the first trigger operation again within a specified duration, and perform the target action again through a second body part. FIG. 3 is a flowchart of a virtual object control method according to an exemplary embodiment of this application. The foregoing method may be performed by a computer device, and the computer device may be a terminal. As shown in FIG. 3, the computer device may control the virtual object in the virtual scene by performing the following steps.

Step 301. Display a virtual scene picture, the virtual scene picture including a first virtual object, and at least two body parts of the first virtual object being equipped with a respective virtual prop. For example, the first body part is equipped with a first virtual prop and the second body part is equipped with a second virtual prop. The first virtual prop and the second virtual prop may be the same type or different types.

In the embodiments of this application, the computer device displays the virtual scene picture in a picture display region. The virtual scene picture may display the first virtual object, and at least two body parts corresponding to the first virtual object are respectively equipped with the first virtual props.

In one implementation, the first virtual object is a virtual object hosted by the computer device, and the first virtual object displayed in the virtual scene picture is a complete virtual object displayed from an angle of view of a third-person, or a part of the virtual object displayed from an angle of view of a first-person.

For example, the first virtual object displayed in the virtual scene picture may be a hand of the virtual object.

In one implementation, the first virtual prop is a virtual prop including at least two parts. Different parts of the virtual prop are respectively equipped at at least two body parts of the first virtual object.

For example, the first virtual prop may be divided into two parts, a first part is equipped at a left-hand part of the first virtual object, and a second part is equipped at a right-hand part of the first virtual object.

The first virtual prop may be a virtual prop used for melee.

For example, the first virtual prop may be a melee weapon double axe, a melee weapon double stick, a melee weapon double knife, or a melee weapon double glove.

Step 302. Control, in response to receiving a first trigger operation, the first virtual object to perform a target action based on the first virtual prop equipped at a first body part, the first body part being one of the at least two body parts.

In the embodiments of this application, when the computer device receives the first trigger operation transmitted by the user, the computer device controls the first virtual prop equipped at the first body part of the first virtual object to perform the target action.

In one implementation, the first trigger operation includes a click trigger operation, a slide trigger operation, and a press trigger operation.

The target action may be an action for controlling the first virtual object to drive the first virtual prop to move according to a specified motion path.

In another possible implementation, the target action may further be an action for controlling the first virtual prop to launch virtual ammunition.

Step 303. Control, in response to receiving a second trigger operation again within a specified duration after the first trigger operation is received, the first virtual object to perform the target action based on the second virtual prop equipped at a second body part, the second body part being a body part other than the first body part in the at least two body parts. In some embodiments, the second trigger operation is the same as or similar to the first trigger operation, e.g., a click operation. In this case, the second trigger operation is a repetition of the first trigger operation.

In the embodiments of this application, when the computer device receives the first trigger operation again in the specified duration after the first trigger operation is received, the computer device can control another part of the first virtual prop equipped at the second body part of the first virtual object to perform the target action.

In one implementation, the second body part and the first body part belong to the same kind of body part, or different kinds of body parts.

The first trigger operation received again may be a trigger operation of the same kind as the first trigger operation received for the first time, or may be a trigger operation of a different kind from that, and at least one target control for receiving the first trigger operation may be superimposed on the virtual scene picture. In addition, the first trigger operation received for the first time and the first trigger operation received again may act on the same target control, or may also act on different target controls.

In summary, according to the solutions shown in the embodiments of this application, when the terminal receives the first trigger operation, the computer device controls the first virtual prop equipped at the first body part of the first virtual object to perform the target action. When the terminal receives the first trigger operation again within the specified duration of the received first trigger operation, the computer device controls the first virtual prop equipped at the second body part of the first virtual object to perform the target action. According to the foregoing method, when same virtual props are equipped at a plurality of body parts, and two trigger operations are received within a short time, the computer device can control the virtual props equipped at different body parts to perform the target action twice within a short time in the virtual scene, which can shorten a time interval between two successive target actions, thereby improving efficiency of controlling the virtual object to use the virtual prop to perform the target action.

Figure 4:
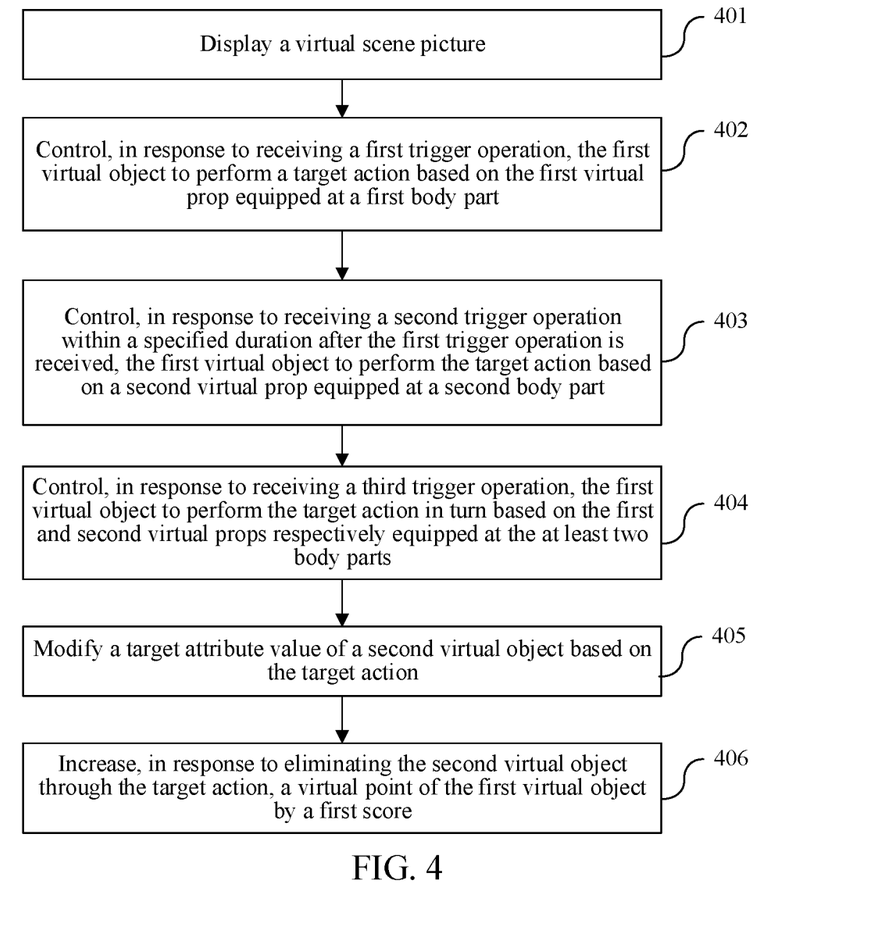
FIG. 4 is a flowchart of a virtual object control method according to an exemplary embodiment of this application.

FIG. 4 is a flowchart of a virtual object control method according to an exemplary embodiment of this application. The foregoing method may be performed by a computer device, and the computer device may be a terminal. As shown in FIG. 4, the computer device is used as the terminal, and the terminal may control the virtual object in the virtual scene by performing the following steps.

Step 401. Display a virtual scene picture.

In the embodiments of this application, the terminal displays the virtual scene picture, and the virtual scene picture includes a first virtual object. At least two body parts of the first virtual object are respectively equipped with first virtual props.

In one implementation, the at least two body parts may include two hand parts, two foot parts, a head part, or a trunk part.

For example, when the at least two body parts are two hand parts, the first virtual prop may be a glove virtual prop.

Figure 5:
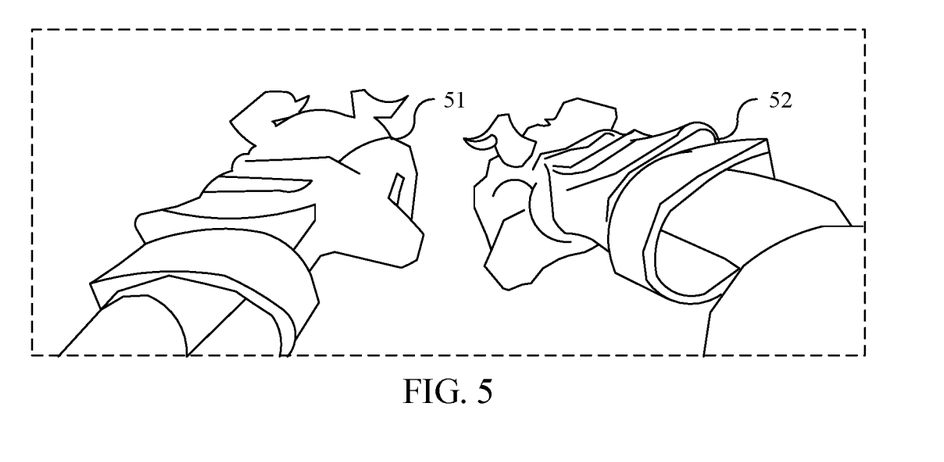
FIG. 5 is a schematic diagram of a glove virtual prop used in the embodiment of FIG. 4.

Exemplarily, FIG. 5 is a schematic diagram of a glove virtual prop used in the embodiments of this application. As shown in FIG. 5, the glove virtual prop is similar to two fists in shape. Two parts of the glove are respectively a left-hand glove virtual prop 51 and a right-hand glove virtual prop 52. When the first virtual object shakes its fist, a first shaking action is performed as the target action, so that the glove virtual prop can perform the target action. A purpose of attacking a virtual object in another camp can be achieved through the first shaking action.

Step 402. Control, in response to receiving a first trigger operation, the first virtual object to perform a target action based on the first virtual prop equipped at a first body part.

In the embodiments of this application, when the terminal receives the first trigger operation operated by the user, the terminal controls the first virtual prop equipped at the first body part of the first virtual object to perform the target action. The first body part is one body part of the at least two body parts.

The first body part is one of the at least two body parts equipped with the first virtual prop on a body of the first virtual object. The second body part may be another body part that is different from the first body part.

The target action includes a body part unfolding action and a body part folding action that are performed sequentially. When the first virtual object does not perform the target action, a first virtual prop in a corresponding part is in a folded state. Therefore, when performing the target action, the first virtual object first performs the body part unfolding action, and then performs the body part folding action.

In one implementation, the first trigger operation includes a click operation performed on a target control superimposed on an upper layer of the virtual scene picture.

Figure 6:
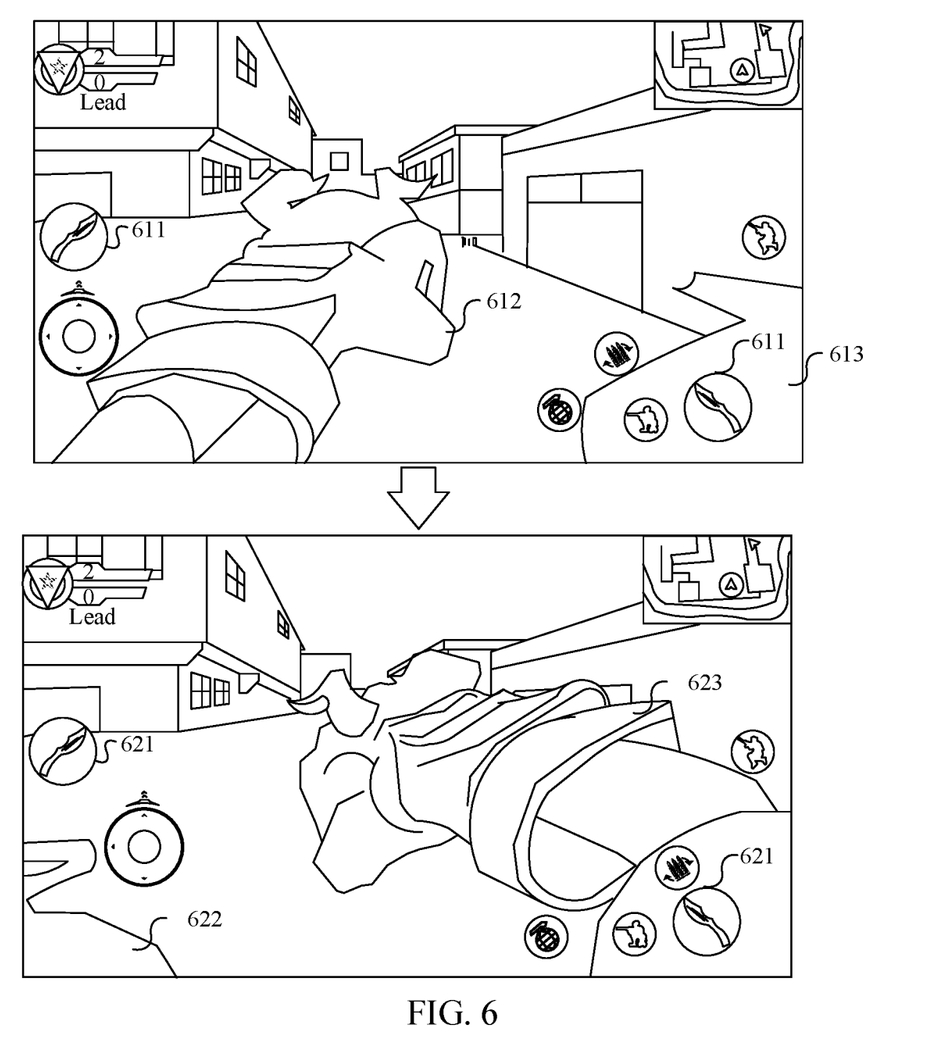
FIG. 6 is a schematic diagram of performing a target action used in the embodiment of FIG. 4.

Exemplarily, if the first virtual prop is the glove virtual prop shown in FIG. 5, FIG. 6 is a schematic diagram of performing a target action used in the embodiments of this application. As shown in FIG. 6, there is a target control 611 superimposed in the virtual scene picture, and there may be more than one target controls 611 in the virtual scene picture. When the user performs the click operation on the target control 611, a left-hand part equipped with the glove virtual prop and originally in the folded state first performs body part unfolding action in the target action, until the left-hand part becomes a fully unfolded state 612. If the first trigger operation is not received again until the left-hand part reaches the fully unfolded state 612, a right-hand part remains in a folded state 613.

In one implementation, in response to receiving a sliding operation on the target control, a sliding direction is obtained. When the sliding direction is a left side, the first virtual object is controlled to perform the target action through a first virtual prop in the left-hand part. When the sliding direction is a right side, the first virtual object is controlled to perform the target action through a first virtual prop in the right-hand part.

For example, when the terminal receives the first trigger operation on the target control, the first virtual object enters a single-point mode. In the single-point mode, one of at least two body parts of the first virtual object equipped with the first virtual prop can be selected to perform the target action. A method of selecting the body part to perform the target action may be receiving the sliding operation on the target control. If the at least two body parts are respectively the left-hand part and the right-hand part, when a sliding direction corresponding to the sliding operation is sliding to the left, the left-hand part is selected as the body part to perform the target action, and when the sliding direction corresponding to the sliding operation is sliding to the right, the right-hand part is selected as the body part to perform the target action.

Step 403. Control, in response to receiving a second trigger operation (which can be the same as the first trigger operation) within a specified duration after the first trigger operation is received, the first virtual object to perform the target action based on a second virtual prop equipped at a second body part.

In the embodiments of this application, when the terminal receives a first trigger operation, timing is started, and when the first trigger operation is received again within the specified duration, the terminal controls the first virtual prop equipped at the second body part of the first virtual object to perform the target action.

The second body part is another body part other than the first body part in the at least two body parts.

In one implementation, the specified duration is no longer than a duration for which the body part unfolding action is fully performed.

Exemplarily, the first virtual prop is the glove virtual prop. When the terminal receives the first trigger operation, and controls the first virtual prop corresponding to the first body part, that is, the left-hand part, to perform the body part unfolding action, and when the body part unfolding action is not fully performed, if the terminal receives the first trigger operation again, the terminal makes the first virtual prop corresponding to the left-hand part perform the body part folding action again after the body part unfolding action is performed, and controls, after the left-hand part is fully folded, the first virtual prop corresponding to the second body part, that is, the right-hand part, to perform the body part unfolding action. As shown in FIG. 6, when the terminal receives the first trigger operation on a target control 621 again, first, the left-hand part in a fully unfolded state starts to perform the body part folding action until the left-hand part is in a fully folded state 622. Then, the right-hand part equipped with the glove virtual prop that is originally in the folded state performs the body part unfolding action in the target action until it completely changes to an unfolded state 623 of the right-hand part.

For example, a process that the first trigger operation is received again within the specified duration, so that the first virtual prop corresponding to the second body part performs the target action can become a double-click operation mode. The target control can be a fire control corresponding to the shooting game. After completing equipping of the first virtual prop, a player clicks the target control for the first time, and then clicks the target control immediately within the specified duration for the second time. By receiving the operation, the terminal can control the first virtual object in the virtual scene to perform an attack action of the right-hand part after completing an attack action of the left-hand part. The attack action includes a punching action and a folding action, which are respectively corresponding to the body part unfolding action and the body part folding action. If time of a punching action of a left first is 0.5 seconds, the player needs to complete the first trigger operation twice within 0.5 seconds to enter the double-click operation mode and perform a punching action of the right-hand part.

In one implementation, in response to receiving the first trigger operation again within the specified duration after the first trigger operation is received, the body part unfolding action performed based on the first virtual prop equipped at the first body part is terminated, and the first virtual object is immediately controlled to perform the target action based on the first virtual prop equipped at the second body part.

Exemplarily, the first virtual prop is the glove virtual prop. When the terminal receives the first trigger operation, and controls the first virtual prop corresponding to the first body part, that is, the left-hand part, to perform the body part unfolding action, and when the body part unfolding action is not fully performed, if the terminal receives the first trigger operation again, the terminal makes the first virtual prop corresponding to the left-hand part terminate performing the body part unfolding action and directly perform the body part folding action, and controls the first virtual prop corresponding to the second body part, that is, the right-hand part, to perform the body part unfolding action after the left-hand part is fully folded or immediately.

For example, when the player needs to improve flexibility of controlling the first virtual object to perform the target action by using the first virtual prop in the virtual scene, the player can quickly double-click the target control, so that the terminal quickly receives the first trigger operation twice, thereby terminating performing a corresponding target action by the first body part, and directly performing the body part folding action, to adjust to start the target action performed by the second body part more quickly. By using the foregoing method, flexibility of controlling the virtual object to perform the target action can be greatly improved. If the first target action is a meaningless action, resources of the terminal can be saved.

Step 404. Control, in response to receiving a third trigger operation, the first virtual object to perform the target action in turn based on the first and second virtual props respectively equipped at the at least two body parts.

In the embodiments of this application, when the terminal receives the second trigger operation, the terminal can control the first virtual object to perform the target action in turn based on the first virtual props respectively equipped at the at least two body parts.

The second trigger operation includes a long press operation performed on a target control superimposed and displayed on an upper layer of the virtual scene picture.

In one implementation, in response to receiving the long press operation on the target control, the terminal enters a combo mode, performs the body part unfolding action according to the first virtual prop equipped at the first body part, and performs the body part folding action, and then the first virtual prop equipped at the second body part performs the body part unfolding action, and performs the body part folding action. The foregoing action performing process is an action cycle. When actions in one action cycle are completed, a next action cycle is performed, and the foregoing actions are repeated, so as to achieve a purpose of performing the target action in turn.

In one implementation, when the long press operation ends, controlling the first virtual object to perform the target action in turn based on the first virtual props respectively equipped at the at least two body parts is stopped.

When the user stops pressing the target control, that is, releases the target control, the first virtual object is controlled to stop performing a cycle of the target action in turn, and a body part in a process of the target action at the current moment directly performs the body part folding action, to restore an initial state of a body part before the target action is performed.

For example, after the user long presses the fire control, the terminal is in the combo mode, and the user controls an attack action of the first virtual object to be a left-fist attack action and a right-fist attack action to loop until the user releases hands.

Step 405. Modify a target attribute value of a second virtual object based on the target action.

In the embodiments of this application, the terminal modifies the target attribute value of the second virtual object by detecting a process of completing the target action.

The second virtual object is a virtual object located within an action range of the target action. The target attribute value may be a health point of the second virtual object. In some embodiments, the action range of the target action is dependent, at least in part, upon a corresponding virtual prop associated with the target action. In other words, the action range associated with the first virtual prop equipped at the first body part may be the same as or different from the action range associated with the second virtual prop equipped at the second body part. For example, if the second virtual prop is more powerful than the first virtual prop, then the target action associated with the second virtual prop has a greater action range than that of the first virtual prop.

In one implementation, the second virtual object located within the action range of the target action is determined; and the target attribute value of the second virtual object is modified to zero to eliminate the second virtual object.

Figure 7:
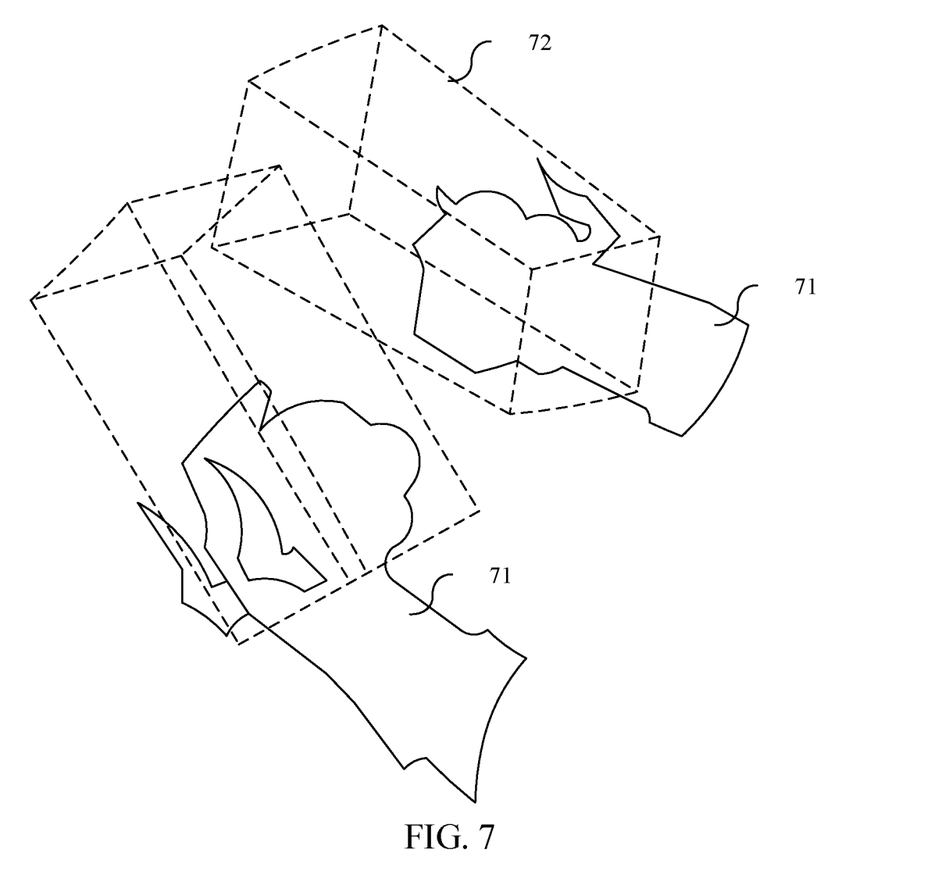
FIG. 7 is a schematic diagram of a damage detection used in the embodiment of FIG. 4.

Exemplarily, the first virtual prop may be detected by arranging a collision box on the outside to determine whether the second virtual object can be damaged. FIG. 7 is a schematic diagram of a damage detection used in the embodiments of this application. As shown in FIG. 7, a rectangular collision box 72 is arranged on an outer side of a first virtual prop 71. When the first virtual prop performs the body part unfolding action in the target action, if the second virtual object collides with the collision box 72, it is determined that the target action can modify the target attribute value of the second virtual object.

In one implementation, a duration of performing each target action is obtained, and based on the duration of each target action, a modified value corresponding to the second virtual object at the current moment is determined. The modified value is positively correlated with the duration, and the target attribute value of the second virtual object is reduced by a corresponding modified value.

Exemplarily, when the target action is continuously performed for the first time, if the target action is detected to act on a virtual object A, a value of a target attribute value of the virtual object A can be reduced to a first value. When the target action is continuously performed for the second time, if the target action is detected to act on a virtual object B, a value of a target attribute value of the virtual object B can be reduced to a second value. The second value is greater than the first value.

Step 406. Increase, in response to eliminating the second virtual object through the target action, a virtual point of the first virtual object by a first score.

In the embodiments of this application, after the terminal eliminates the second virtual object through the target action, at least one of a personal virtual point of the first virtual object and a virtual point corresponding to a camp to which the first virtual object belongs is increased by the first score.

The virtual point is used for making statistics after the virtual scene display ends, and for determining a virtual object corresponding to the virtual scene that wins.

In one implementation, a number of the second virtual objects in virtual objects continuously eliminated by the first virtual object through the target action is obtained, and the first score is determined based on the number of the second virtual objects in the virtual objects continuously eliminated by the first virtual object through the target action.

Exemplarily, if the virtual object A is a first virtual object that is eliminated by the target action of the first virtual prop, an increased score of the first virtual object is a first numerical score, and if the virtual object B is a second virtual object that is eliminated by the target action of the first virtual prop, an increased score of the first virtual object is a second numerical score. The second numerical score may be twice the first numerical score, or the second numerical score may be a numerical score greater than a specified threshold of the first numerical score.

The number of the second virtual objects eliminated through the target action is obtained, and a first multiple is determined. The first multiple is positively correlated with a first quantity. The virtual point of the first virtual object is increased by a second score, and the virtual point of the first virtual object is updated. The second score is a product of the first multiple, the first score, and the first quantity.

Figure 8:
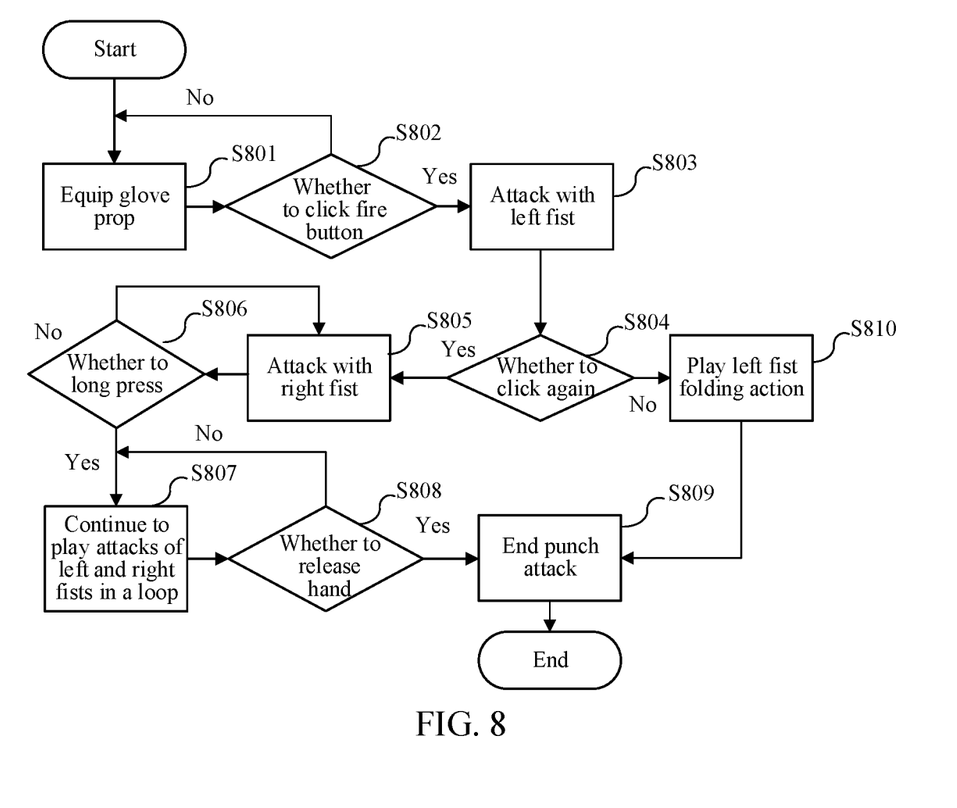
FIG. 8 is a flowchart of logic for controlling execution of a target action used in the embodiment of FIG. 4.

A process of performing the target action through the first virtual prop can be implemented by using the virtual object control method in this embodiment. FIG. 8 is a flowchart of logic for controlling execution of a target action used in the embodiments of this application. As shown in FIG. 8, specific steps are as follows. First, a terminal controls a first virtual object to be equipped with a glove weapon as a first virtual prop (S801). Determine whether the terminal has received a click operation on a fire button. If it is determined that the terminal has not received the click operation on the fire button, continue to perform real-time detection and determination (S802). If it is determined that the click operation on the fire button has been received, the terminal controls the first virtual object to shake a left first to perform an attack action (S803). Then the terminal detects whether the click operation on the fire button is received again (S804). If it is determined that the click operation on the fire button is received again, control the first virtual object to shake a right first to perform the attack action (S805). Then determine whether a long press operation on the fire button is received. If the long press operation on the fire button is not received, continue to perform the attack action of the right first (S806). If the long press operation on the fire button is received, continue to play the attack actions of the left and right fists in a loop (S807). Then determine whether to cancel the long press operation on the fire button according to whether a user releases hand. If it is not canceled, continue to play the attack actions of the left and right fists in a loop (S808). If it is detected that it has been canceled, terminate performing a punch attack action (S809). If it is determined that the click operation on the fire button is not received again, continue to perform the attack action by shaking the left first until the punch attack action ends (S810).

In summary, according to the solutions shown in the embodiments of this application, when the terminal receives the first trigger operation, the computer device controls the first virtual prop equipped at the first body part of the first virtual object to perform the target action. When the terminal receives the first trigger operation again within the specified duration of the received first trigger operation, the computer device controls the first virtual prop equipped at the second body part of the first virtual object to perform the target action. According to the foregoing method, when same virtual props are equipped at a plurality of body parts, and two trigger operations are received within a short time, the computer device can control the virtual props equipped at different body parts to perform the target action twice within a short time in the virtual scene, which can shorten a time interval between two successive target actions, thereby improving efficiency of controlling the virtual object to use the virtual prop to perform the target action.

In addition, a virtual weapon, a virtual gun, melee weapon double axes, melee weapon double sticks, melee weapon double knives, melee weapon double gloves, and the like involved in the embodiments of this application are virtual objects in a game scene, and actions such as shooting, attack, battle, and the like involved in the embodiments are actions performed by the virtual objects in the game scene.

Figure 9:
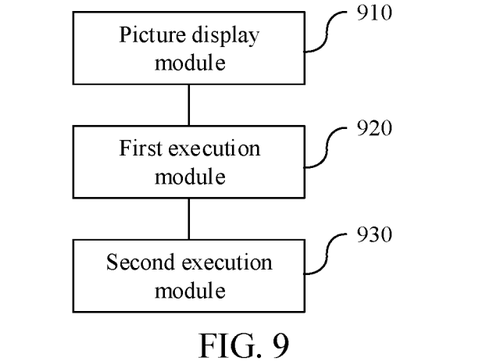
FIG. 9 is a structural block diagram of a virtual object control apparatus according to an exemplary embodiment of this application.

FIG. 9 is a structural block diagram of a virtual object control apparatus according to an exemplary embodiment of this application. The apparatus may be arranged in the first terminal 110 or the second terminal 130 in the system shown in FIG. 1 or another terminal in the system. The apparatus includes:

a picture display module 910, configured to display a virtual scene picture, the virtual scene picture including a first virtual object, and each of at least two body parts of the first virtual object being equipped with a respective virtual prop, e.g., a first body part being equipped with a first virtual prop and a second body part being equipped with a second virtual prop;

a first execution module 920, configured to control, in response to receiving a first trigger operation, the first virtual object to perform a target action based on the first virtual prop equipped at the first body part, the first body part being one of the at least two body parts; and a second execution module 930, configured to control, in response to receiving the first trigger operation again within a specified duration after the first trigger operation is received, the first virtual object to perform the target action based on the second virtual prop equipped at the second body part, the second body part being a body part other than the first body part in the at least two body parts.

In one implementation, the target action includes a body part unfolding action and a body part folding action that are performed sequentially; and
- the specified duration is no longer than a duration for which the body part unfolding action is fully performed.

In one implementation, the second execution module 930 includes:
- an execution submodule, configured to terminate, in response to receiving the first trigger operation again within the specified duration after the first trigger operation is received, the body part unfolding action performed based on the first virtual prop equipped at the first body part, and immediately control the first virtual object to perform the target action based on the second virtual prop equipped at the second body part.

In one implementation, the first trigger operation includes a click operation performed on a target control superimposed on an upper layer of the virtual scene picture.

In one implementation, the apparatus further includes:
- a third execution module, configured to control, in response to receiving a third trigger operation, the first virtual object to perform the target action in turn based on the first and second virtual props respectively equipped at the at least two body parts.

In one implementation, the second trigger operation includes a long press operation performed on a target control superimposed on an upper layer of the virtual scene picture.

In one implementation, the apparatus further includes:
- a fourth execution module, configured to, when the long press operation ends, controlling the first virtual object to stop performing the target action in turn based on the first and second virtual props respectively equipped at the at least two body parts.

In one implementation, the apparatus further includes:
- an attribute value modification module, configured to modify a target attribute value of a second virtual object based on the target action, the second virtual object being a virtual object located within an action range of the target action.

In one implementation, the attribute value modification module includes:
- an object determining submodule, configured to determine the second virtual object located within the action range of the target action; and
- an object elimination submodule, configured to modify the target attribute value of the second virtual object to zero to eliminate the second virtual object.

In one implementation, the apparatus further includes:
- a point increasing submodule, configured to increase, in response to eliminating the second virtual object through the target action, a virtual point of the first virtual object by a first score.

In one implementation, the apparatus further includes:
- a number obtaining submodule, configured to obtain a number of the second virtual objects in virtual objects that are continuously eliminated by the first virtual object through the target action before in response to eliminating the second virtual object through the target action, a virtual point of the first virtual object is increased by a first score; and
- a score determining submodule, configured to determine the first score based on the number of the second virtual objects in the virtual objects that are continuously eliminated by the first virtual object through the target action.

In one implementation, the at least two body parts include two hand parts, and the first virtual prop is a glove virtual prop.

In summary, according to the solutions shown in the embodiments of this application, when the terminal receives the first trigger operation, the computer device controls the first virtual prop equipped at the first body part of the first virtual object to perform the target action. When the terminal receives the first trigger operation again within the specified duration of the received first trigger operation, the computer device controls the first virtual prop equipped at the second body part of the first virtual object to perform the target action. According to the foregoing method, when same virtual props are equipped at a plurality of body parts, and two trigger operations are received within a short time, the computer device can control the virtual props equipped at different body parts to perform the target action twice within a short time in the virtual scene, which can shorten a time interval between two successive target actions, thereby improving efficiency of controlling the virtual object to use the virtual prop to perform the target action.

Figure 10:
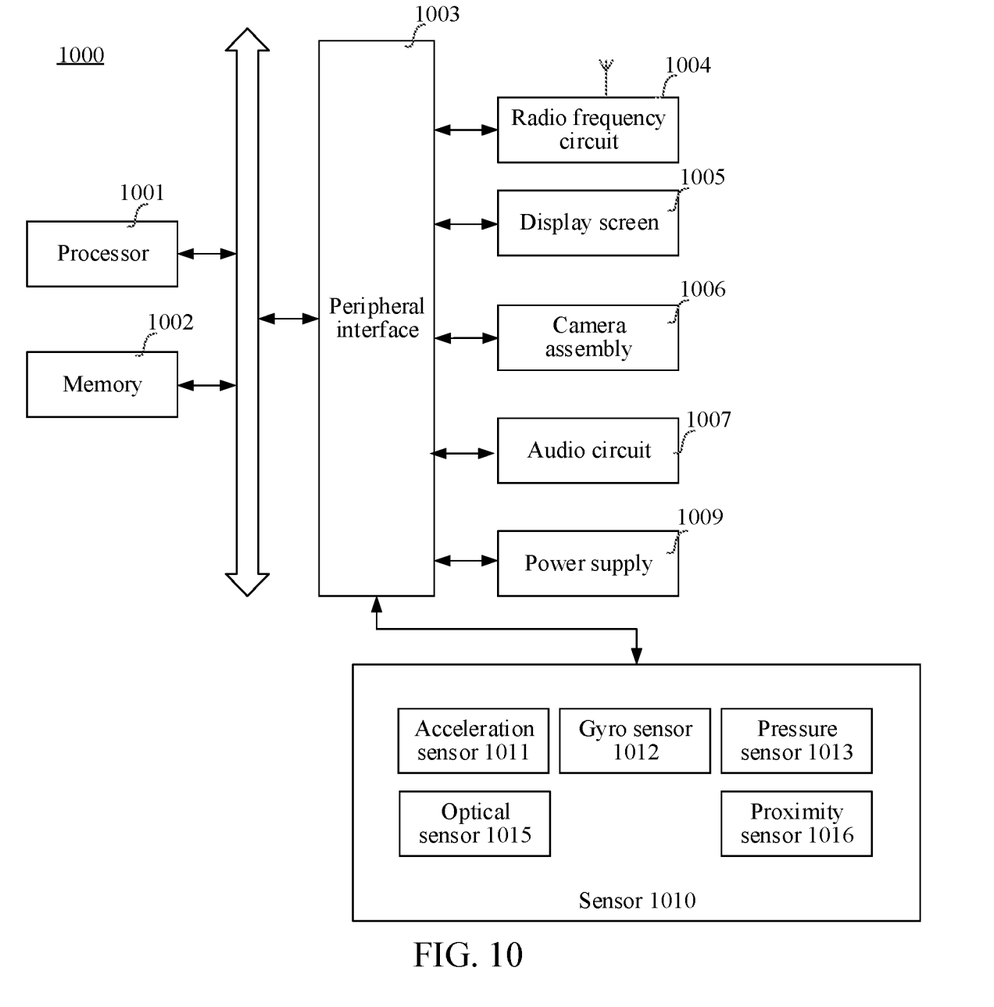
FIG. 10 is a structural block diagram of a computer device according to an exemplary embodiment of this application.

FIG. 10 is a structural block diagram of a computer device 1000 according to an exemplary embodiment. The computer device 1000 may be a user terminal, such as a smartphone, a tablet computer, a moving picture experts group audio layer III (MP3) player, a moving picture experts group audio layer IV (MP4) player, a notebook computer, or a desktop computer. The computer device 1000 may also be referred to as another name such as user equipment, a portable terminal, a laptop terminal, or a desktop terminal.

Generally, the computer device 1000 includes: a processor 1001 and a memory 1002.

The processor 1001 may include one or more processing cores, such as a 4-core processor or an 8-core processor. The processor 1001 may be implemented by at least one hardware form in a digital signal processing (DSP), a field-programmable gate array (FPGA), and a programmable logic array (PLA). The processor 1001 may also include a main processor and a co-processor. The main processor is a processor for processing data in a wake-up state, also referred to as a central processing unit (CPU). The coprocessor is a low power consumption processor configured to process data in a standby state. In some embodiments, the processor 1001 may be integrated with a graphics processing unit (GPU). The GPU is configured to be responsible for rendering and drawing content that a display needs to display. In some embodiments, the processor 1001 may also include an AI processor for processing computing operations related to machine learning.

The memory 1002 may include one or more computer-readable storage media, which may be non-transitory. The memory 1002 may also include a high-speed random access memory, as well as non-volatile memory, such as one or more disk storage devices and flash storage devices. In some embodiments, the non-transitory computer-readable storage medium in the memory 1002 is configured to store at least one instruction, and the at least one instruction being configured to be executed by the processor 1001 to implement all or part of steps in the method provided in the method embodiments of this application.

In some embodiments, the computer device 1000 may optionally include a peripheral interface 1003 and at least one peripheral. The processor 1001, the memory 1002 and the peripheral interface 1003 may be connected by a bus or a signal line. Each peripheral may be connected to the peripheral interface 1003 by a bus, signal line, or a circuit board. Specifically, the peripheral includes at least one of a radio frequency circuit 1004, a display screen 1005, a camera assembly 1006, an audio circuit 1007, and a power supply 1009.

The peripheral interface 1003 may be configured to connect at least one peripheral related to input/output (I/O) to the processor 1001 and the memory 1002. In some embodiments, the processor 1001, the memory 1002, and the peripheral interface 1003 are integrated on the same chip or the same circuit board. In some other embodiments, any one or two of the processor 1001, the memory 1002 and the peripheral interface 1003 may be implemented on a separate chip or circuit board, which is not limited in this embodiment.

The display screen 1005 is configured to display a user interface (UI). The UI may include a graph, a text, an icon, a video, and any combination thereof. When the display screen 1005 is a touch display screen, the display screen 1005 also has the ability to collect a touch signal at or above the surface of the display screen 1005. The touch signal may be input, as a control signal, to the processor 1001 for processing. At this moment, the display screen 1005 may also be configured to provide virtual buttons and/or virtual keyboards, also referred to as soft buttons and/or soft keyboards. In some embodiments, there may be one display screen 1005, disposed on a front panel of the computer device 1000. In some other embodiments, there may be at least two display screens 1005 disposed on different surfaces of the computer device 1000 or folded. In some still other embodiments, the display screen 1005 may be a flexible display screen disposed on a bent surface or a folded surface of the computer device 1000. Even further, the display screen 1005 may be arranged in a non-rectangular irregular pattern, i.e. a special-shaped screen. The display screen 1005 may be prepared by using materials such as a liquid crystal display (LCD), an organic light-emitting diode (OLED), or the like.

In some embodiments, the computer device 1000 further includes one or more sensors 1010. The one or more sensors 1010 include but are not limited to an acceleration sensor 1011, a gyro sensor 1012, a pressure sensor 1013, an optical sensor 1015, and a proximity sensor 1016.

A person skilled in the art may understand that the structure shown in FIG. 10 does not constitute any limitation on the computer device 1000, and the computer device may include more components or fewer components than those shown in the figure, or some components may be combined, or a different component deployment may be used.

In an exemplary embodiment, a non-transitory computer-readable storage medium including an instruction is further provided, for example, a memory including at least one instruction, at least one program, a code set, or an instruction set. The at least one instruction, the at least one program, the code set, or the instruction set may be executed by a processor to implement all or some steps of the method shown in an embodiment corresponding to FIG. 3 or FIG. 4. For example, the non-transitory computer-readable storage medium may be a read-only memory (ROM), a random access memory (RAM), a compact disc read-only memory (CD-ROM), a magnetic tape, a floppy disk, an optical data storage device, and the like.

According to an aspect of this application, a computer program product or a computer program is provided, including computer instructions, the computer instructions being stored in a computer-readable storage medium. A processor of a terminal reads the computer instructions from the computer-readable storage medium, and executes the computer instructions, to cause the terminal to perform the virtual object control method provided in the optional implementations of the foregoing aspects.

After considering the specification and practicing the present disclosure, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is limited by the appended claims only. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method of controlling a virtual object in a virtual scene performed by a computer device, the method comprising:

displaying a virtual scene picture including a first virtual object and a second virtual object, the first virtual object including a first body part equipped with a first virtual prop and a second body part equipped with a second virtual prop and the second virtual object being located within an action range of a target action performed by the first virtual object;

in response to receiving a first trigger operation on a target control of the first virtual object, controlling the first virtual object to perform the target action against the second virtual object based on the first virtual prop equipped at the first body part of the first virtual object and displaying a launch of the first virtual prop from the first body part towards the second virtual object along a predefined motion path of the first virtual prop; and in response to receiving a second trigger operation on the target control of the first virtual object within a specified duration after the first trigger operation is received, displaying a retract of the first virtual prop back to the first body part; and after the first virtual prop resumes its original position at the first body part, controlling the first virtual object to perform the target action against the second virtual object based on the second virtual prop equipped at the second body part of the first virtual object and displaying a launch of the second virtual prop from the second body part towards the second virtual object according to a predefined motion path of the second virtual prop.

2. The method according to claim 1, wherein the target action comprises a body part unfolding action and a body part folding action that are performed sequentially; and the specified duration is no longer than a duration for which the body part unfolding action is fully performed.

3. The method according to claim 2, wherein the controlling the first virtual object to perform the target action based on the second virtual prop equipped at the second body part of the first virtual object comprises:

in response to receiving the second trigger operation within the specified duration after the first trigger operation is received, terminating the body part unfolding action performed based on the first virtual prop equipped at the first body part, and immediately controlling the first virtual object to perform the target action based on the second virtual prop equipped at the second body part.

4. The method according to claim 1, wherein the first virtual prop equipped at the first body part is different from the second virtual prop equipped at the second body part.

5. The method according to claim 1, further comprising:
in response to receiving a third trigger operation, controlling the first virtual object to perform the target action in turn based on the virtual props respectively equipped at the first and second body parts of the first virtual object.

6. The method according to claim 5, wherein the third trigger operation comprises a long press operation performed on a target control superimposed on an upper layer of the virtual scene picture.

7. The method according to claim 1, further comprising:
modifying a target attribute value of a second virtual object based on the target action, the second virtual object being a virtual object located within an action range of the target action.

8. The method according to claim 7, wherein the action range of the target action is dependent, at least in part, upon a corresponding virtual prop associated with the target action.

9. The method according to claim 1, wherein the first and second body parts comprise two hand parts, and the first and second virtual props are two glove virtual props.

10. A computer device, comprising a processor and a memory, the memory storing at least one instruction, and the at least one instruction being loaded and executed by the processor and causing the computer device to implement a method of controlling a virtual object in a virtual scene, the method comprising:

displaying a virtual scene picture including a first virtual object and a second virtual object, the first virtual object including a first body part equipped with a first virtual prop and a second body part equipped with a second virtual prop and the second virtual object being located within an action range of a target action performed by the first virtual object;

in response to receiving a first trigger operation on a target control of the first virtual object, controlling the first virtual object to perform the target action against the second virtual object based on the first virtual prop equipped at the first body part of the first virtual object and displaying a launch of the first virtual prop from the first body part towards the second virtual object along a predefined motion path of the first virtual prop; and in response to receiving a second trigger operation on the target control of the first virtual object within a specified duration after the first trigger operation is received, displaying a retract of the first virtual prop back to the first body part; and after the first virtual prop resumes its original position at the first body part, controlling the first virtual object to perform the target action against the second virtual object based on the second virtual prop equipped at the second body part of the first virtual object and displaying a launch of the second virtual prop from the second body part towards the second virtual object according to a predefined motion path of the second virtual prop.

11. The computer device according to claim 10, wherein the target action comprises a body part unfolding action and a body part folding action that are performed sequentially; and the specified duration is no longer than a duration for which the body part unfolding action is fully performed.

12. The computer device according to claim 11, wherein the controlling the first virtual object to perform the target action based on the second virtual prop equipped at the second body part of the first virtual object comprises:

in response to receiving the second trigger operation within the specified duration after the first trigger operation is received, terminating the body part unfolding action performed based on the first virtual prop equipped at the first body part, and immediately controlling the first virtual object to perform the target action based on the second virtual prop equipped at the second body part.

13. The computer device according to claim 10, wherein the first virtual prop equipped at the first body part is different from the second virtual prop equipped at the second body part.

14. The computer device according to claim 10, wherein the method further comprises:
in response to receiving a third trigger operation, controlling the first virtual object to perform the target action in turn based on the virtual props respectively equipped at the first and second body parts of the first virtual object.

15. The computer device according to claim 14, wherein the third trigger operation comprises a long press operation performed on a target control superimposed on an upper layer of the virtual scene picture.

16. The computer device according to claim 10, wherein the method further comprises:
modifying a target attribute value of a second virtual object based on the target action, the second virtual object being a virtual object located within an action range of the target action.

17. The computer device according to claim 16, wherein the action range of the target action is dependent, at least in part, upon a corresponding virtual prop associated with the target action.

18. The computer device according to claim 10, wherein the first and second body parts comprise two hand parts, and the first and second virtual props are two glove virtual props.

19. A non-transitory computer-readable storage medium, storing at least one computer program, the computer program being loaded and executed by a processor of a computer device and causing the computer device to implement a method of controlling a virtual object in a virtual scene, the method comprising:

displaying a virtual scene picture including a first virtual object and a second virtual object, the first virtual object including a first body part equipped with a first virtual prop and a second body part equipped with a second virtual prop and the second virtual object being located within an action range of a target action performed by the first virtual object;

in response to receiving a first trigger operation on a target control of the first virtual object, controlling the first virtual object to perform the target action against the second virtual object based on the first virtual prop equipped at the first body part of the first virtual object and displaying a launch of the first virtual prop from the first body part towards the second virtual object along a predefined motion path of the first virtual prop; and in response to receiving a second trigger operation on the target control of the first virtual object within a specified duration after the first trigger operation is received, displaying a retract of the first virtual prop back to the first body part; and after the first virtual prop resumes its original position at the first body part, controlling the first virtual object to perform the target action against the second virtual object based on the second virtual prop equipped at the second body part of the first virtual object and displaying a launch of the second virtual prop from the second body part towards the second virtual object according to a predefined motion path of the second virtual prop.

20. The non-transitory computer-readable storage medium according to claim 19, wherein the target action comprises a body part unfolding action and a body part folding action that are performed sequentially; and the specified duration is no longer than a duration for which the body part unfolding action is fully performed.

\* \* \* \* \*